United States Patent [19]
Schuessler, Jr. et al.

[11] Patent Number: 5,803,108
[45] Date of Patent: Sep. 8, 1998

[54] TOOL AND METHOD FOR INSERTING A FILTER ELEMENT INTO THE VALVE STEM OF A WHEEL ASSEMBLY

[75] Inventors: Warren E. Schuessler, Jr., Florissant; Ray G. Buckles; Efim V. Sulpovar, both of St. Louis; Steven J. Nagel, Creve Coeur, all of Mo.

[73] Assignee: International Marketing, Inc., Chambersburg, Pa.

[21] Appl. No.: 762,502

[22] Filed: Dec. 9, 1996

[51] Int. Cl.⁶ .......................... F16K 43/00; F16K 51/00; B60C 29/04
[52] U.S. Cl. .......................... 137/15; 29/221.5; 137/223; 137/315; 137/549; 141/5; 141/9; 141/38; 141/67; 141/100; 152/154.1; 152/427; 152/429; 210/429; 210/432
[58] Field of Search .......................... 137/15, 315, 544, 137/549, 550, 223, 231; 29/221.5, 221.6, 802, 890.123; 141/5, 9, 38, 67, 100; 152/154.1, 427, 429, DIG. 5; 210/429, 432

[56] References Cited

U.S. PATENT DOCUMENTS

| | | | |
|---|---|---|---|
| 732,871 | 7/1903 | Lemp | 137/329.04 |
| 832,038 | 10/1906 | Carlsson | 137/549 |
| 844,776 | 2/1907 | Carlson | 137/549 |
| 1,142,871 | 6/1915 | Bracken | 137/481 |
| 1,204,232 | 11/1916 | Anderson | 137/539 |
| 1,393,365 | 10/1921 | Heil | 29/221.6 |
| 1,403,056 | 1/1922 | Noble | 251/252 |
| 1,689,280 | 10/1928 | Fansler, Sr. | 137/480 |
| 1,799,998 | 4/1931 | Zwicky | 210/429 |
| 1,847,068 | 3/1932 | Campbell | 55/417 |
| 3,100,335 | 8/1963 | Lea | 29/221.5 |
| 3,148,694 | 9/1964 | Casey et al. | 137/203 |
| 3,208,133 | 9/1965 | Morton | 29/221.5 |
| 3,561,090 | 2/1971 | Fritch | 29/221.5 |
| 3,835,884 | 9/1974 | Ishikawa et al. | 137/550 |
| 3,926,205 | 12/1975 | Gourlet | 137/223 |
| 4,276,898 | 7/1981 | Ross | 137/231 |
| 4,528,735 | 7/1985 | Eastridge et al. | 29/221.5 |
| 4,734,194 | 3/1988 | Kalman et al. | 210/429 |
| 4,736,766 | 4/1988 | Bathrick et al. | 210/432 |
| 4,807,343 | 2/1989 | Wadsworth | 29/221.5 |
| 4,991,617 | 2/1991 | Butler | 137/223 |
| 5,073,217 | 12/1991 | Fogal | 152/154.1 |
| 5,097,580 | 3/1992 | Story | 29/221.5 |
| 5,409,036 | 4/1995 | Ahmadian et al. | 137/549 |
| 5,472,023 | 12/1995 | Fogal, Sr. et al. | 152/154.1 |
| 5,479,975 | 1/1996 | Fogal, Sr. et al. | 137/223 |
| 5,522,910 | 6/1996 | Fogal, Sr. | 55/505 |

*Primary Examiner*—George L. Walton
*Attorney, Agent, or Firm*—Senniger, Powers, Leavitt & Roedel

[57] ABSTRACT

This invention is directed to a method for inhibiting particulate material in a pneumatic tire from adversely affecting operation of a tire valve assembly The method involves inserting a filter element into a valve stem passage of the valve assembly while the valve assembly is connected to the wheel assembly, and then installing a sealing valve in the valve stem passage. The invention also relates to a tool for inserting the filter element into the valve assembly to inhibit particulate material from passing into the valve assembly while allowing fluid to pass therethrough. The tool comprises a body selectively attachable to the valve assembly. The body has a plurality of passages therein, including a plunger passage, a filter passage and a fluid passage, and a selector valve having two bores therein for selective registry with the plurality of passages. The selector valve is movable between a first position in which the fluid passage is in fluid communication with the valve stem passage and a filter element is loaded into one of the bores in the selector valve through the filter passage, and a second position in which the fluid passage is blocked against fluid communication with the valve stem passage and a plunger is adapted to move through the plunger passage and the bore loaded with the filter element to push the filter element into the valve stem passage.

30 Claims, 7 Drawing Sheets

TOOL AND METHOD FOR INSERTING A FILTER ELEMENT INTO THE VALVE STEM OF A WHEEL ASSEMBLY

BACKGROUND OF THE INVENTION

This invention relates generally to a tool and method for inhibiting particulate material in a pneumatic tire from adversely affecting operation of a tire valve assembly, and more particularly to a tool and method for inserting a filter element into the valve assembly to inhibit particulate material from passing into the valve assembly while allowing fluid to pass therethrough.

Recent improvements in the methods of balancing a pneumatic wheel assembly and reducing the radial and lateral force variations within the wheel assembly under varying load conditions include the introduction of particulate or pulverulent material into a tire. One such method is disclosed in U.S Pat. No. 5,073,217, which is incorporated herein by reference. The particulate material is mixed with pressurized fluid, such as air, and injected into the wheel assembly through the tire valve stem by a suitable injecting device, such as the device shown and described in U.S. Pat. Nos. 5,386,857 and 5,472,023, which are also incorporated herein by reference. One well-known particulate material is a polymeric synthetic plastic material sold by International Marketing, Inc. under the trademark "EQUAL."

The particulate material is injected into the tire of the wheel assembly with the valve core absent from the valve stem, such as in a new tire prior to installation of the valve core or in an older tire where the valve core has been removed from the valve stem, to allow free flow of the material into the tire. The tire is typically inflated or at least partially inflated during injection of the material into the tire. After injecting the material into the tire, the valve core is installed into the valve stem and the tire is inflated to the desired inflation pressure.

The valve core controls the flow of fluid through the valve stem by opening and closing a valve relative to a valve seat. It is important to the operation of the valve core that the valve and its associated valve seat remain free of particulate material. However, when the valve is opened to release pressurized fluid from the tire or to check the tire pressure, the above described particulate material may be drawn into the valve core and adversely affect operation of the valve core components, as by preventing the valve from fully closing against the valve seat, resulting in fluid continually leaking from the tire. It is also not uncommon for tires to contain other particulate matter such as dust, dirt, or particles of rubber which have dislodged from the interior bead of the tire during use of the wheel assembly. These particles may also be drawn into the valve core and adversely affect operation of the valve core components.

To reduce this risk, it is known to provide a valve stem having a movable filter element permanently enclosed within the valve stem between the valve core and the interior of the tire so that fluid is allowed to flow through the filter element while particulate material is retained within the tire and inhibited from reaching the valve core. For example, the valve stem shown and described in U.S. Pat. No. 5,479,975, which is incorporated herein by reference, includes such a filter. While this valve stem is quite useful, users of particulate material such as EQUAL may desire a method of removably installing a stationary filter into common or standard valve stems already used in the industry rather than replacing the valve stems with those having permanently installed filters.

Among the several objects and features of the present invention may be noted the provision of a tool for efficiently and reliably inserting a filter element into a valve stem without disconnecting the valve stem from the tire; the provision of such a tool which is used to assemble a valve stem that inhibits particulate material from flowing into a valve core; the provision of such a tool which is mechanically simple; the provision of such a tool which further allows the introduction of particulate material into the tire before the filter is inserted into the valve stem, without disconnecting the tool from the valve stem; and the provision of such a tool which further allows installation of a valve core into the valve stem after insertion of the filter, without disconnecting the tool from the valve stem.

Still further among the several objects and features of the present invention may be noted the provision of a method for inserting a filter into a tire valve stem which can be carried out quickly and simply; the provision of such a method which permits both introduction of particulate material into the tire and insertion of the filter into the valve stem using a single tool; and the provision of such a method which further permits installation of the valve core in the valve stem after insertion of the filter using the single tool.

In general, a tool of the present invention for inserting a filter element into a pneumatic wheel assembly comprises a body having a first passage therein defining a plunger passage. The body is selectively attachable to the valve stem in a position wherein the plunger passage is in communication with the valve stem passage of a valve assembly connected to the wheel assembly. A plunger is mounted on the body for reciprocation with respect to the plunger passage through a forward stroke in which the plunger is adapted to move through the plunger passage to push a filter element into the valve stem passage. The plunger is then movable back through a return stroke. The body also has a second passage therein defining a fluid passage adapted for fluid communication with a source of fluid under pressure. The fluid passage is adapted for fluid communication with the valve stem passage when the body is attached to the valve stem of the valve assembly whereby fluid under pressure may be delivered to an interior volume within the wheel assembly via the valve stem passage.

In another embodiment, a tool of the present invention for inserting a filter element into a wheel assembly comprises a body selectively attachable to the valve stem. The body has an outlet adapted to register with the valve stem passage when the body is attached to the valve stem, a first passage therein defining a plunger passage and a second passage therein defining a filter passage for receiving a filter element. A plunger is mounted on the body for reciprocation through a forward stroke in which the plunger is adapted to push the filter element through the outlet into said valve stem passage. The plunger is then being movable back through a return stroke. Means for moving the filter element received in the filter passage into registry with the plunger passage and the outlet while the body is attached to the valve stem is included to allow the filter element to be pushed by the plunger through the outlet into the valve stem passage.

In yet another embodiment, a method for inhibiting the escape of particulate matter through a valve assembly of a pneumatic wheel assembly comprises first inserting a filter element into a valve stem passage of the valve assembly while a valve stem having a valve stem passage is connected to the wheel assembly in fluid communication with an interior volume of the wheel assembly. The filter element is configured to substantially prevent the passage of particulate matter while allowing the passage of pressurized fluid. A sealing valve is installed in the valve stem passage after insertion of the filter element. The sealing valve is movable between an open position for allowing fluid under pressure to flow through the valve stem passage and a closed sealing position. The sealing valve is positioned between an inlet end of the passage and the filter element whereby the filter functions to substantially prevent particulate matter from inside the interior volume of the wheel assembly from interfering with the sealing closure of the sealing valve.

Other objects and features will become in part apparent and in part pointed out hereinafter.

BRIEF DESCRIPTION OF THE DRAWINGS

Corresponding parts are designated by corresponding numerals throughout the several views of the drawings.

DESCRIPTION OF THE PREFERRED EMBODIMENT

Figure 1:
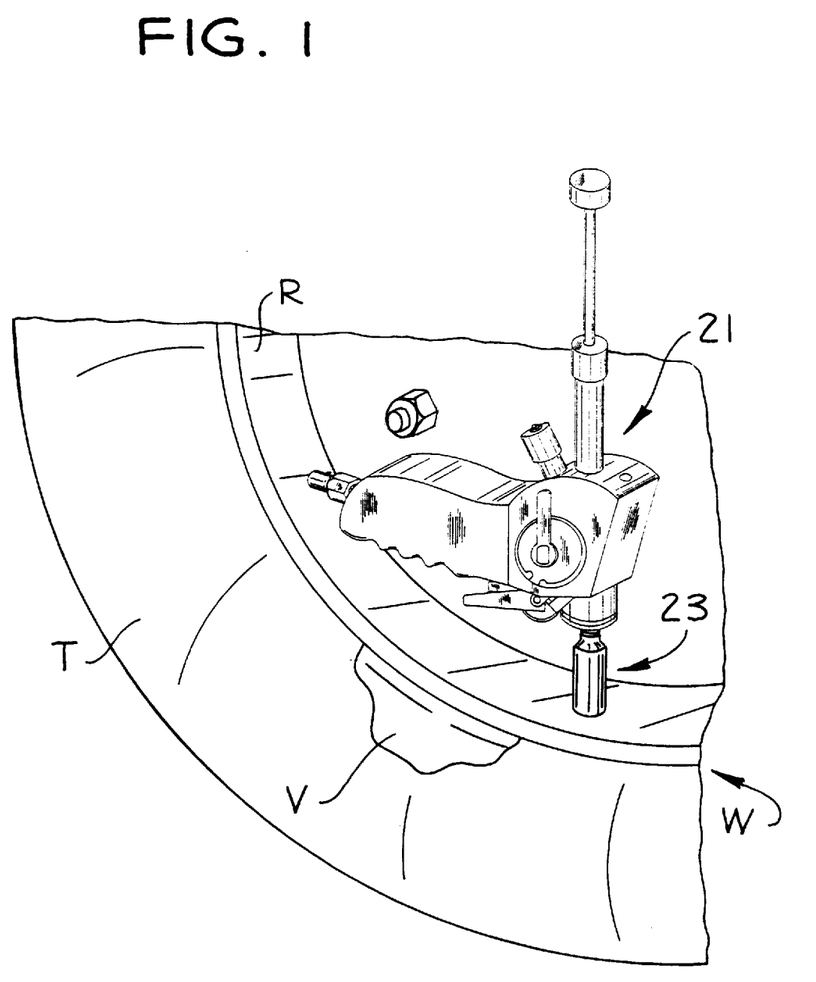
FIG. 1 is a perspective of a tool of the present invention connected to the valve stem of a wheel assembly.

Referring first to FIG. 1, a tool of the present invention for inserting a filter element into a valve assembly of a tire is indicated in its entirety by the reference numeral 21. The tool 21 is shown connected to a pneumatic wheel assembly, indicated generally as W, which comprises a rim R and pneumatic tire T mounted on the rim. The rim R and tire T define an interior volume V within the wheel assembly W for holding pressurized fluid. A valve assembly, indicated generally as 23, is attached to the wheel assembly W in communication with the interior volume V for selectively allowing the flow of pressurized fluid in and out of the interior to inflate or deflate the tire T.

The valve assembly 23 (FIG. 5) comprises a valve stem, indicated generally as 25, and a sealing valve, such as a valve core, indicated generally as 27, seated within the valve stem. The valve stem 25 is substantially tubular having a first or inner end 29 adapted for attachment to the wheel assembly W in communication with the interior volume V, and a second or outer end 31 accessible from outside the wheel assembly. The ends 29, 31 of the valve stem 25 are open such that the interior surface of the stem defines a valve stem passage 33 in communication with the interior volume V of the tire to allow entry and exit of pressurized fluid into and out of the wheel assembly W. The outer end 31 of the valve stem 25 is externally threaded for engagement by a closure cap (not shown) or other suitable connector, and is also internally threaded for engagement with the valve core 27 to secure the valve core within the stem. The valve stem 25 has an internal annular shoulder adjacent its inner end defining a filter seat 35, the function of which is described further herein. However, valve stems not having this filter seat 35 are contemplated to be within the scope of this invention. Additionally, the present invention is not limited to any particular valve stem material, shape, size or method of attachment to the wheel assembly, and it is contemplated that the valve stem 25 may be configured for use with motorcycle tires, automobile tires, light and heavy duty truck tires, aircraft tires and other tires for which valve stems are commonly used to provide fluid communication with the interior of the tire, without departing from the scope of this invention.

Figure 5:
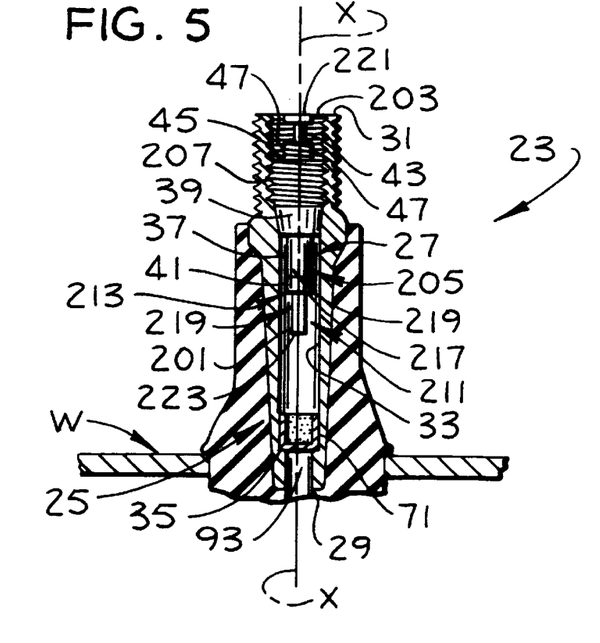
FIG. 5 is a cross sectional view of a valve assembly.

Valve cores are well known in the art for regulating fluid flow into and out of the interior volume V of the wheel assembly W. As seen in FIG. 5, the valve core 27 is typically sized for installation within the valve stem passage 33 to block flow through the passage. The valve core 27 includes a stationary tubular valve seat 37 coaxially positioned in the valve stem 25, an annular sealing member 39 in the gap between the valve seat and the valve stem, and a valve 41 adapted for movement relative to the valve seat between a closed sealing position in which the valve seals against one end of the valve seat to block flow through the valve stem, and an open position in which the valve is spaced away from the valve seat to allow pressurized fluid to flow through the valve stem passage 33. A valve pin 43 attached to the valve 41 extends longitudinally within the valve stem passage 33 through the valve seat 37 to adjacent the outer end 31 of the valve stem 25 and constitutes means for moving the valve to its open position when inflating or deflating the tire. The valve 41 is biased toward its closed sealing position by a spring (not shown). The valve seat 37 is held against outward movement relative to the valve stem 25 by an insert 45 threaded into the outer end 31 of the valve stem. The external surface of the insert 45 is formed with opposing flats 47 for reasons which will become apparent herein.

Figure 2:
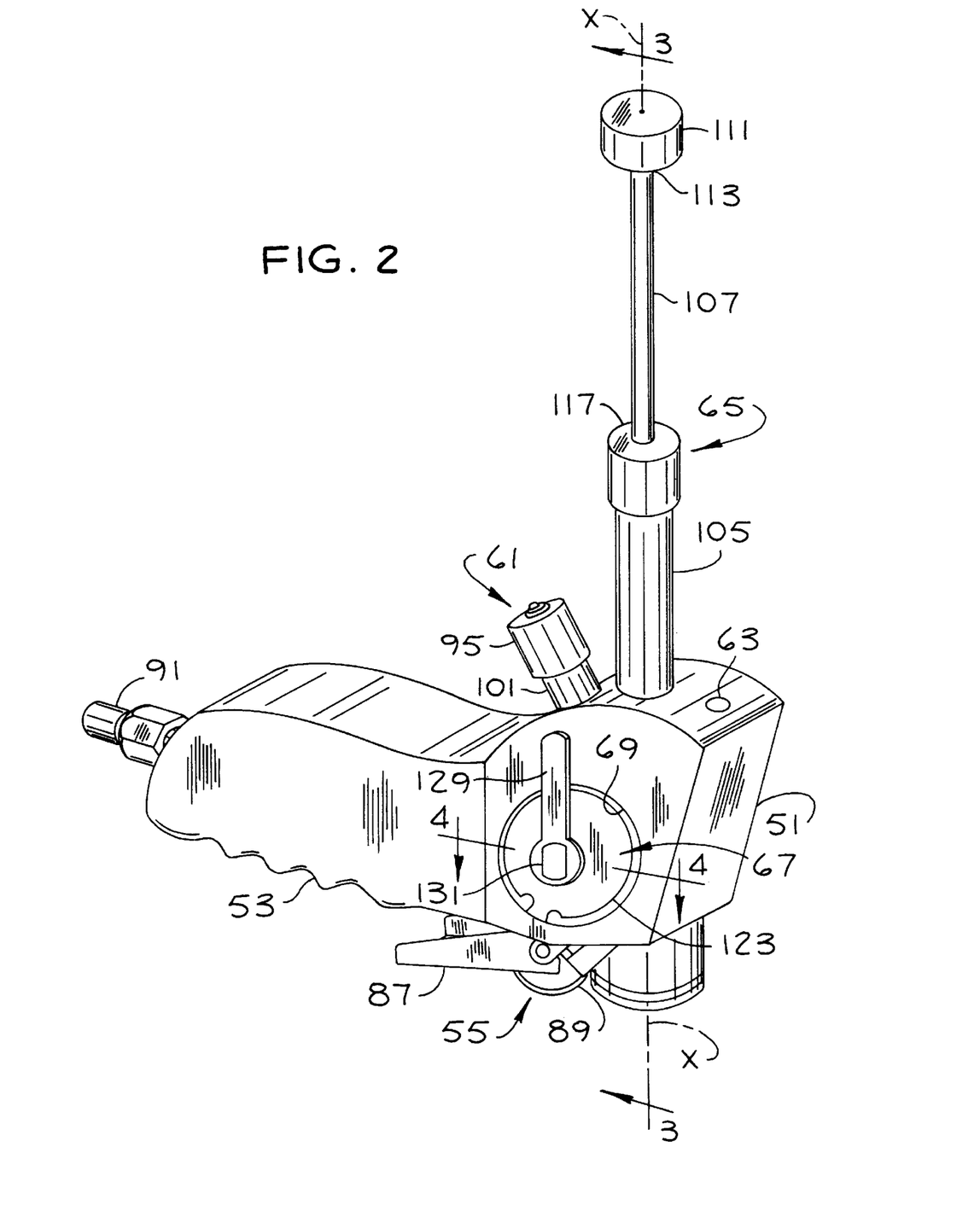
FIG. 2 is a perspective of the tool of FIG. 1.
Figure 3A:
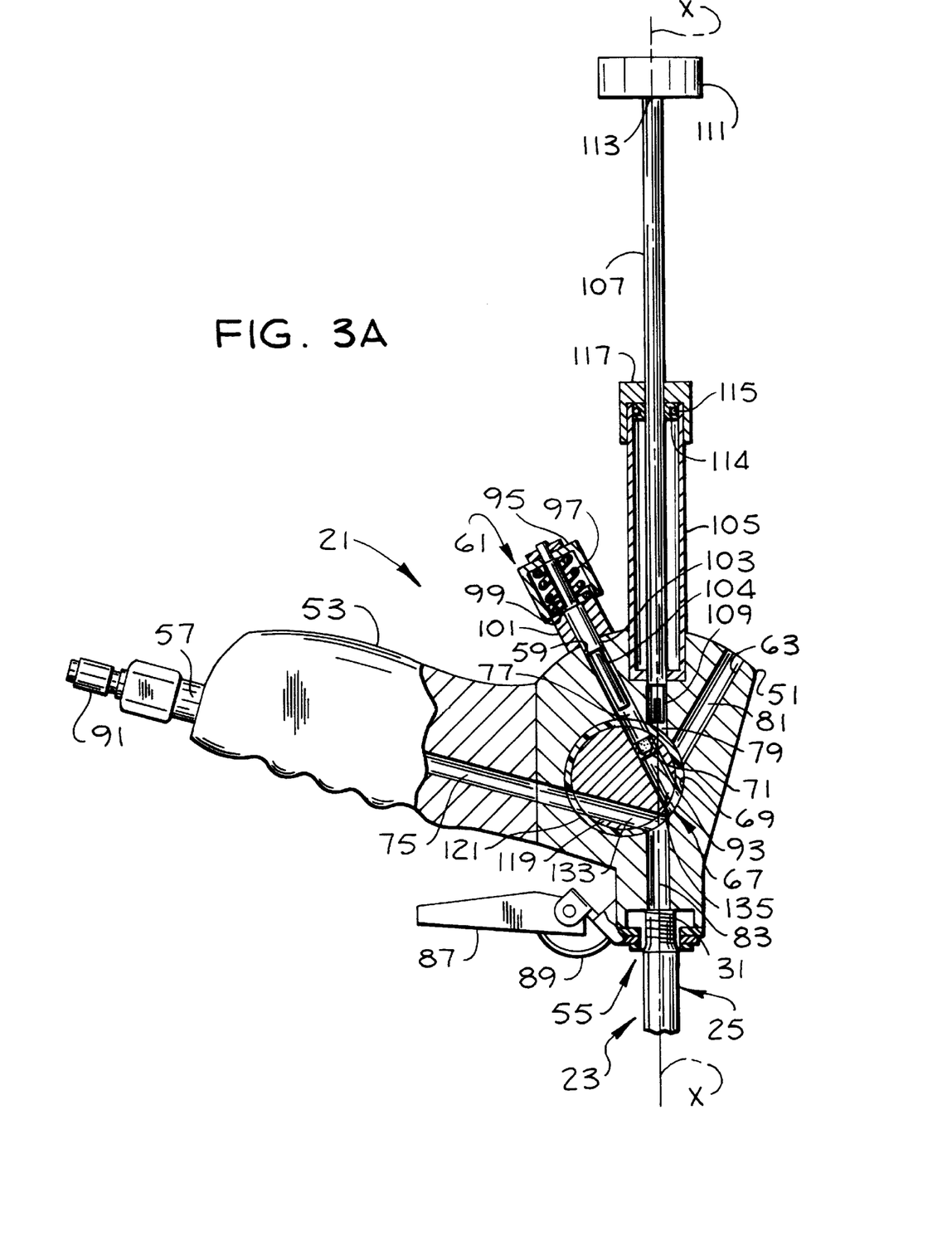
FIGS. 3A–D are fragmented cross sectional views taken along the line 3—3 of FIG. 2 at four different stages of operation of the tool.

With reference to FIGS. 2 and 3A, the tool 21 of the present invention generally comprises a body 51 having a handle 53, a valve stem connector, indicated generally as 55, a fluid inlet 57, a filter insertion inlet 59, a filter loading assembly, indicated generally as 61, a valve core insertion inlet 63, a plunger assembly, indicated generally as 65, and a selector valve, indicated generally as 67, rotatably mounted on the body for selectively configuring the tool to perform various operations while the tool is connected to the valve stem 25. For example, the tool 21 of the preferred embodiment is used for injecting particulate or pulverulent material into the interior volume V of the wheel assembly W, inserting a filter element 71 into the valve stem 25, and then installing the valve core 27 into the valve stem. The tool 21 shown in FIG. 2 is approximately 6.965 inches in length measured along the handle and body, 9.325 inches in depth measured along the valve stem connector and plunger assembly, and 1 inch in width. However, these dimensions may vary depending on the particular type of wheel assembly W and valve stem 25 for which the tool 21 is used.

The body 51 is preferably a unitary piece constructed of suitable material, such as plastic, brass, aluminum or steel, but it may be fabricated from multiple parts or other materials and be within the scope of this invention. The handle 53 extends outward from the body 51 to provide a means for grasping the tool 21 while connecting the tool to the valve stem 25 and performing the various operations. The handle 53 is preferably ergonometrically configured to provide for comfortable grasping of the handle by the operator of the tool 21. The body 51 has a generally cylindrical opening 69 extending laterally therethrough for receiving the selector valve 67, the purpose of which will be described later. Various passages (FIGS. 3A–D), such as a fluid passage 75, a filter passage 77, a plunger passage 79, a valve core passage 81 and an outlet passage 83 (broadly an "outlet") extend outward from the opening 69 in the body 51 of the tool 21 to allow communication between the opening and the various components located about the periphery of the body and handle 53, as will be described.

The outlet passage 83 (FIGS. 3A–D) in the body is in direct alignment with a central longitudinal axis X of the valve stem passage 33 when the tool 21 is connected to the valve stem 25 to provide communication between the opening 69 in the body 51 and the valve stem passage. The valve stem connector 55 is preferably a quick disconnect coupler that allows for quick releasing engagement of the tool 21 with the valve stem 25. This connector 55 includes a trigger 87 pivotally connected to the tool 21 in spaced relationship with the handle 53 so that the trigger may be squeezed using the same hand that grasps the handle of the tool. A suitable spring clamp 89 is connected to the trigger 87 and is operable to engage the valve stem 25 releasably to connect the tool 21 to the stem. For example, squeezing the trigger 87 moves the spring clamp 89 away from the valve stem 25 to allow the connector 55 to be placed over the valve stem. Releasing the trigger 87 allows the spring clamp 89 to move under its own spring force into engagement with the valve stem 25 to releasably connect the tool 21 to the stem. Construction and operation of this type of connector is commonly known in the art, as disclosed in U.S. Pat. No. 4,276,898, and is described herein only for the purpose of providing a means for connecting the tool to the tire valve assembly. Other connecting means, such as those commonly know in the art for connecting gas or liquid supply lines, may be used without departing from the scope of this invention.

As best seen in FIGS. 3A–D, the fluid passage 75 extends through the body 51 and handle 53 to allow communication between the opening 69 in the body and the fluid inlet 57. A connector 91 is attached to the end of the handle 53 at the fluid inlet 57 for connection with a source of fluid. The fluid being defined herein as gas (such as air, nitrogen, or other suitable gases commonly uses for inflating the tire of a wheel assembly), liquid, or a mixture of gas or liquid under pressure and a particulate or pulverulent material. The particulate material is preferably a fine powder used for balancing the wheel assembly W and reducing the radial and lateral force variations within the wheel assembly under varying load conditions, such as the material described in U.S Pat. No. 5,073,217, which is incorporated herein by reference. One such particulate material is a polymeric synthetic plastic material sold by International Marketing, Inc. under the trademark "EQUAL." The fluid source is preferably an injection device which mixes pressurized gas with the particulate material and injects the mixture into the interior volume V of the wheel assembly W, such as the injection device shown and described in U.S. Pat. Nos. 5,386,857 and 5,472,023, which are also incorporated herein by reference. It is understood, however, that the connector 91 may be connected to other fluid sources, whether or not particulate in nature, without departing from the scope of this invention.

The filter passage 77 provides communication between the opening 69 in the body 51 and the filter insertion inlet 59 and is sized for receiving the filter element 71. A tubular guide 101 extends outward from the body 51 in registry with the filter insertion inlet for properly guiding the filter element into the filter passage. The filter element 71 is preferably a screen woven of suitable material such as stainless steel, cloth or nylon, and has a mesh sized to prevent particulate material in the interior volume V of the wheel assembly W and large enough to interfere with proper operation of the valve core 27 from passing into the valve stem passage 33, while causing little interruption in the rate of fluid flow through the valve stem passage. For example, the mesh size should preferably range from about 5 microns to 100 microns, and is more preferably about 40–50 microns. As shown in FIGS. 3A–D, the filter element 71 is generally cup-shaped (e.g., a hollow cylinder having a closed end 93), the closed end being in the path of fluid flowing through the valve stem passage 33. The diameter of the filter element 71 is slightly less than the diameter of the valve stem passage 33 so that the element seats tightly within the passage against the filter seat 35. Because of the small mesh size, the filter element 71 is sufficiently rigid or stiff to hold its shape upon insertion into the valve stem 25.

Figure 6:
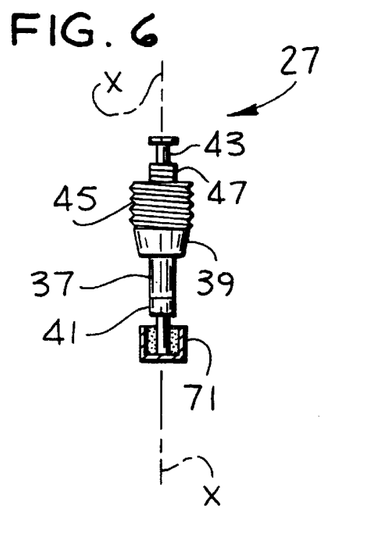
FIG. 6 is a front elevational view of a sealing valve with filter element affixed thereto and shown in section.

The filter element 71 is preferably pre-formed into its cup shape, but it may also be formed as it is inserted into the body 51 through the filter insertion inlet 59. Moreover, rather than using a screen-type element, the filter element 71 may be constructed of sintered materials, such as sintered stainless steel, sintered magnesium, sintered manganese and other sintered materials formed using known powdered metallurgical processes, or other porous media commonly used for filtering particulate material. The filter element 71 may also be spherical, disc shaped, or other suitable shapes without departing from the scope of this invention. As shown in FIG. 6, it is also contemplated that the filter element 71 may be affixed to the valve core 27 such as by bonding or other suitable means so that the combined filter element and valve core could be inserted into the filter insertion inlet 59 for delivery through the filter passage 77 toward the opening 69 in the body 51.

Still referring to FIGS. 3A–D, the filter loading assembly 61 is removable from the body 51 to allow loading of the filter element 71 into the filter passage 77 through the filter insertion inlet 59. The assembly 61 is then replaceable on the body 51 for pushing the filter element 71 toward the opening 69 in the body. The assembly 61 comprises a generally cylindric cap 95 having a closed top and an open bottom. A coil spring 97 in the cap 95 pushes against a seat 99 adjacent the open end of the cap adapted for contact with the tubular guide 101. The seat 99 and guide 101 are sized slightly smaller than the cap 95 to allow telescoping sliding movement of the cap relative to the seat and guide. The guide 101 acts as a reaction surface for the seat 99 for compressing the spring 97 as the cap 95 is pushed down over the seat and guide. A push rod or ram 103 is connected to the top of the cap 95 and extends through the seat 99 and guide 101 into the filter passage 77 in the body 51, with the ram being sufficiently long so that a free end 104 of the ram extends substantially into the opening 69 in the body when the spring 97 is compressed. The seat 99 is engageable with a shoulder on the ram 103 to hold the seat and spring 97 in assembly with the ram and within the cap 95.

In the preferred embodiment, the diameter of the free end 104 of the ram 103 is sized slightly smaller than the diameter of the filter element 71 so that the ram seats within the open end of the cup-shaped filter element for pushing the element toward the opening 69 in the body 51. It is contemplated that other suitable means for urging the filter element 71 through the passage 77 toward the opening 69 in the body 51 may be used without departing from the scope of this invention.

The plunger passage 79 provides communication between the opening 69 in the body 51 and the plunger assembly 65, and is aligned with the central longitudinal axis X of the valve stem passage 33. As seen in FIGS. 3A–D, the plunger assembly 65 includes a guide tube 105 attached to the body 51 and extending outward from the body in alignment with the plunger passage 79, and a plunger 107 adapted for reciprocating movement in the guide tube 105 through a forward stroke in which a working end or head 109 of the plunger passes through the opening 69 in the body 51 through the outlet passage 83 into the valve stem passage 33, and a reverse stroke in which the head of the plunger is retracted into the plunger passage or entirely into the guide tube. The plunger 107 is preferably sufficiently long to extend into the valve stem passage 33 upon moving through its forward stroke. A cap 117 is mounted over the top of the guide tube 105 to secure the plunger 107 within the tube. It is understood that the plunger assembly 65 may be flexible, so that the plunger assembly need not be aligned with the central longitudinal axis X of the valve stem passage 33, without departing from the scope of this invention, as long as the head 109 of the plunger 107 is adapted for movement into the valve stem passage.

The head 109 of the plunger 107 is sized slightly smaller than the diameter of the filter element 71 for seating within the open end of the cup-shaped filter element to push the element into the valve stem passage 33. The head 109 is also preferably forked to fit over the flats 47 of the valve core insert 45. The plunger 107 is rotatable on its axis for screwing the valve core 27 into the valve stem 25. A disc-shaped knob 111 is mounted on the opposite (tail) end 113 of the plunger 107 for ease of handling and manipulating the plunger. An annular stop 114 is attached to the plunger 107 for movement within the guide tube 105. The stop 114 is sized larger than the openings in the guide tube 105 through which the plunger 107 extends so that the stop limits the forward stroke of the plunger into the valve stem passage 33, thereby limiting the depth of insertion of the filter element 71 into the passage. A suitable O-ring 115 seated in an annular groove in the stop 114 provides a seal between the stop and the guide tube 105 to prevent pressurized fluid from escaping the interior volume V of the wheel assembly W while the plunger 107 is in use, thereby maintaining the pressure within the wheel assembly.

While the plunger passage 79 is shown and described as extending toward the opening 69 in the body 51, it is contemplated that the plunger passage may extend through the body so that the plunger passage is in direct registry with the valve stem passage and that the filter passage may be in direct registry with the plunger passage so that a filter element received in the filter passage may be loaded directly into the plunger passage and pushed by the plunger through the plunger passage into the valve stem passage.

The valve core passage 81 provides communication between the opening 69 in the body 51 and the valve core insertion inlet 63 for delivery of a valve core 27 toward the opening. If necessary, the valve core 27 may be pushed toward the opening 69 using the filter loading assembly 61 described above. It is contemplated that the valve core 27 may be received in the filter passage 77 rather than a valve core passage 81 without departing from the scope of this invention.

Figure 3D:
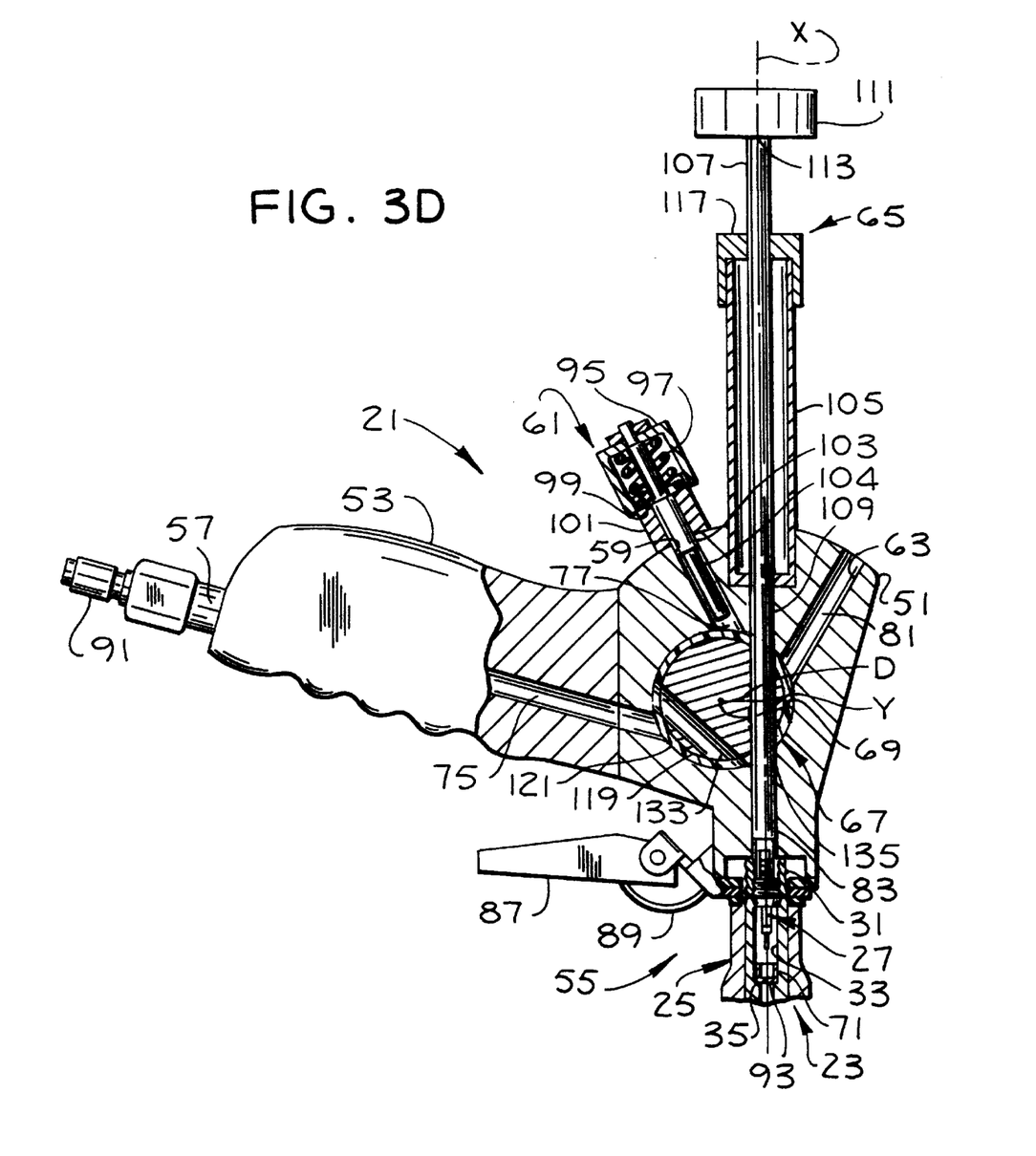
Figure 4:
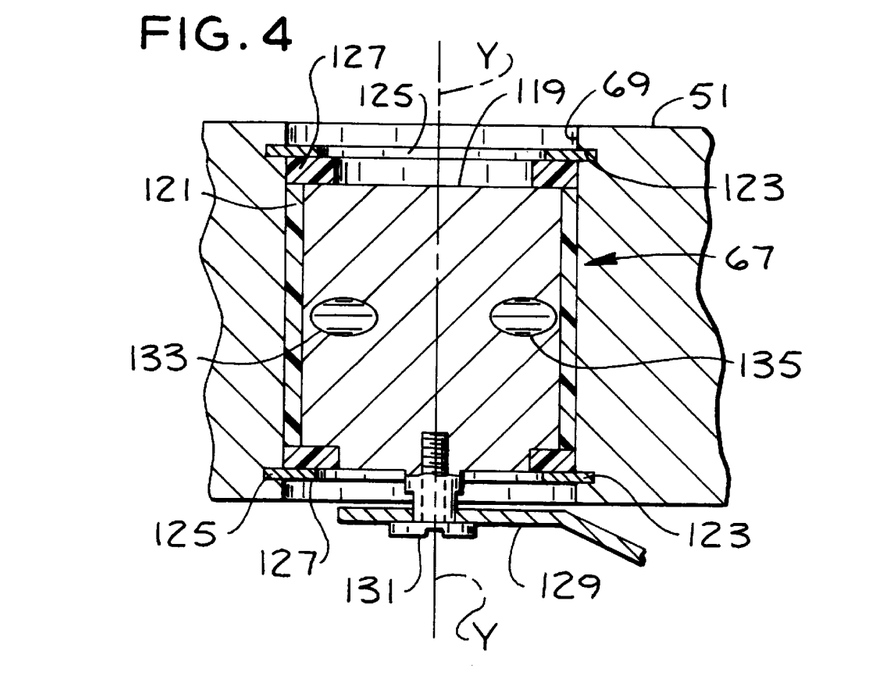
FIG. 4 is a fragmented cross sectional view taken along the line 4—4 of FIG. 2.

With reference to FIG. 4, the selector valve 67 (broadly, "moving means" or "means for moving the filter element 71 into registry with the plunger passage 79 and the valve stem passage 33") is rotatably mounted in the opening 69 in the body 51 for selectively performing the various operations of the tool 21. The selector valve 67 is generally cylindrical and is preferably of two-piece construction having a cylindrical core 119 constructed of brass or other suitable metal, and a sleeve 121 constructed of teflon or other suitable sealing, low-friction material surrounding the circumference of the core. The diameter of the selector valve 67 is slightly smaller than the diameter of the opening 69 in the body 51 so that the selector valve fits tightly in the opening. For example, the selector valve shown in FIG. 4 is about 1.25 inches in diameter. However, the diameter of the selector valve 67 may vary depending on the size of the tool 21 and the diameter of the opening 69 in the body 51. The teflon sleeve 121 seals the selector valve against the body while allowing rotation of the selector valve 67 relative to the body 51 about a rotational axis Y extending laterally with respect to the body. As shown in FIG. 3D, this axis Y is offset from the longitudinal axis X of the valve stem passage 33 by a distance D, although it is contemplated that the rotational axis of the selector valve 67 may intersect the longitudinal axis of the valve stem passage without departing from the scope of this invention.

The selector valve 67 is secured within the opening 69 in the body 51 by snap-rings 123 (FIG. 4) fitted into annular grooves 125 in the body 51 on each side of the selector valve. A non-metallic washer 127 is placed between each snap-ring 123, which is typically constructed of metal, and the selector valve 67 to prevent the core of the valve from rubbing against the snap-ring as the valve is rotated. It is understood, however, that means other than snap-rings 123 and washers 127 may be used for rotatably securing the selector valve 67 within the opening 69 in the body 51 without departing from the scope of this invention, as long as the valve is free to rotate relative to the opening about its rotational axis Y. Rotation of the selector valve 67 within the opening 69 in the body 51 between predetermined settings is affected by a lever 129 fitted over a stub shaft 131 extending outward from one side of the selector valve.

Two passages or bores 133, 135 extend through the selector valve 67 and are adapted for selective registry with the various passages 75, 77, 79, 81, 83 extending within the body 51 as the selector valve is rotated between its different settings (FIGS. 3A–D). The body 51 or the selector valve 67 may have stop limits (not shown) to assure proper positioning of the valve bores 133, 135 in registry with the passages 75, 77, 79, 81, 83. As shown in FIGS. 3A–D, the selector valve bores 133, 135 are completely separate from each other, there being no communication between the bores. The bores 133, 135 are also angled relative to one another and are directed along chords of the selector valve 67 so that neither bore extends through the rotational axis Y of the selector valve. For example, in the preferred embodiment these bores 133, 135 are angled approximately 45–50 degrees with respect to each other. However, the relative angle may vary according to the location of the various passages 75, 77, 79, 81, 83 within the body.

Operation of the tool 21 according to the method of the present invention will now be described with reference to FIGS. 3A–D. The pressure within the interior volume V of the wheel assembly W is adjusted such that the tire T, whether new or used, is partially inflated, as for example, to less than one-half of its rated pressure. As shown in FIG. 3A, the tool 21 is releasably connected to the valve stem 25 by grasping the handle 53 and squeezing the trigger 87 of the valve stem connector 55, placing the connector over the valve stem, and then releasing the trigger to allow the spring clamp 89 to move under its own spring force into releasable engagement with the valve stem to secure the tool on the stem. The plunger 107 is initially retracted so that the head 109 of the plunger is withdrawn into the guide tube 105 or plunger passage 79, and the selector valve 67 is positioned in a first setting in which the first bore 133 of the selector valve is in registry with the outlet passage 83 and the fluid passage 75 of the body 51 to provide communication between the valve stem passage 33 and the fluid source. A mixture of particulate material and pressurized gas is then injected into the fluid inlet 57 and directed through the fluid passage 75 , the first bore 133 and the outlet passage 83 for injection through the valve stem passage 33 into the interior volume V of the wheel assembly W. After injection of the particulate material into the interior volume V, pressurized gas is delivered to the fluid inlet 57 and directed through the valve stem passage 33 into the interior volume V of the wheel assembly W to inflate the tire R to the desired pressure.

With the selector valve 67 still positioned in this first setting, the second bore 135 in the selector valve is in registry with the filter passage 77. The filter loading assembly 61 is removed from the body 51 and a filter element 71 is loaded into the passage through the filter insertion inlet 59. The assembly 61 is then replaced over the inlet 59 with the free end 104 of the ram 103 extending into the filter passage 77 and seating within the open end of the cup-shaped filter element 71. The cap 95 of the assembly 61 is pushed down over the guide 101 toward the body 51 whereby the ram 103 pushes the filter element 71 into the second bore 135 in the selector valve 67. Compression of the coil spring 97 caused by pushing the cap 95 down over the guide 101 biases the cap away from the body 51 so that when the cap is released, the ram 103 retracts out of the second bore 135. The other end of the second bore 135 is closed by the body 51 so that the filter element 71 is retained within this bore as shown in FIG. 3A until the selector valve 67 is rotated to another setting.

Figure 3B:
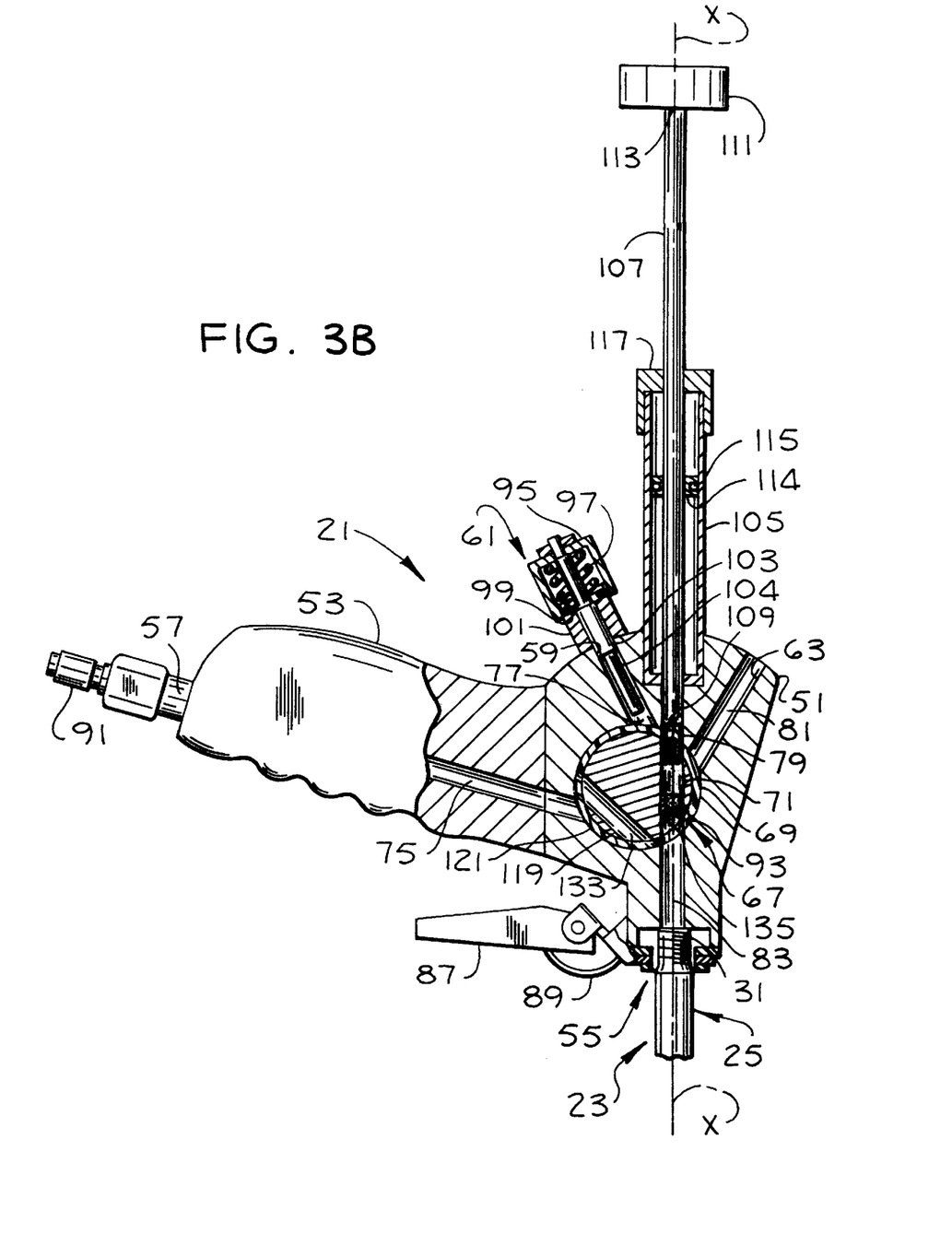

With the filter element 71 loaded in the second bore 135 in the selector valve 67, the lever 129 is then used to rotate the selector valve to a second setting, as best seen in FIG. 3B, in which the first bore 133 is no longer in registry with the fluid passage 75 and outlet passage 83 of the body 51, thus preventing the escape of gas from the interior volume V of the wheel assembly W through the fluid passage, and in which the second selector valve bore 135, in which the filter element 71 is loaded, is aligned with the central longitudinal axis X of the valve stem passage 33 in registry with the plunger passage 79 and the outlet passage 83. In this setting, the open end of the cup-shaped filter element 71 preferably faces the head 109 of the plunger 107. The plunger 107 is pushed forward in the guide tube 105 to move the head 109 of the plunger into the second bore 135 to seat within the open end of the cup-shaped filter element 71. Further forward movement of the plunger 107 pushes the filter element 71 through the aligned outlet passage 83 and into the valve stem passage 33 until the filter element seats against the filter seat 35 within the valve stem 25. The plunger 107 is then pulled back through a return stroke to move the head 109 of the plunger back into the plunger passage 79 (or into the guide tube 101). Where the valve stem 25 does not have a filter seat 35, it is contemplated that the top of the guide tube 105 will limit the forward stroke of the plunger 107 and hence limit the depth of insertion of the filter element 71 into the valve stem passage 33, whereby the tight fit of the filter element against the interior of the valve stem will act to secure the element within the valve stem passage.

Figure 3C:
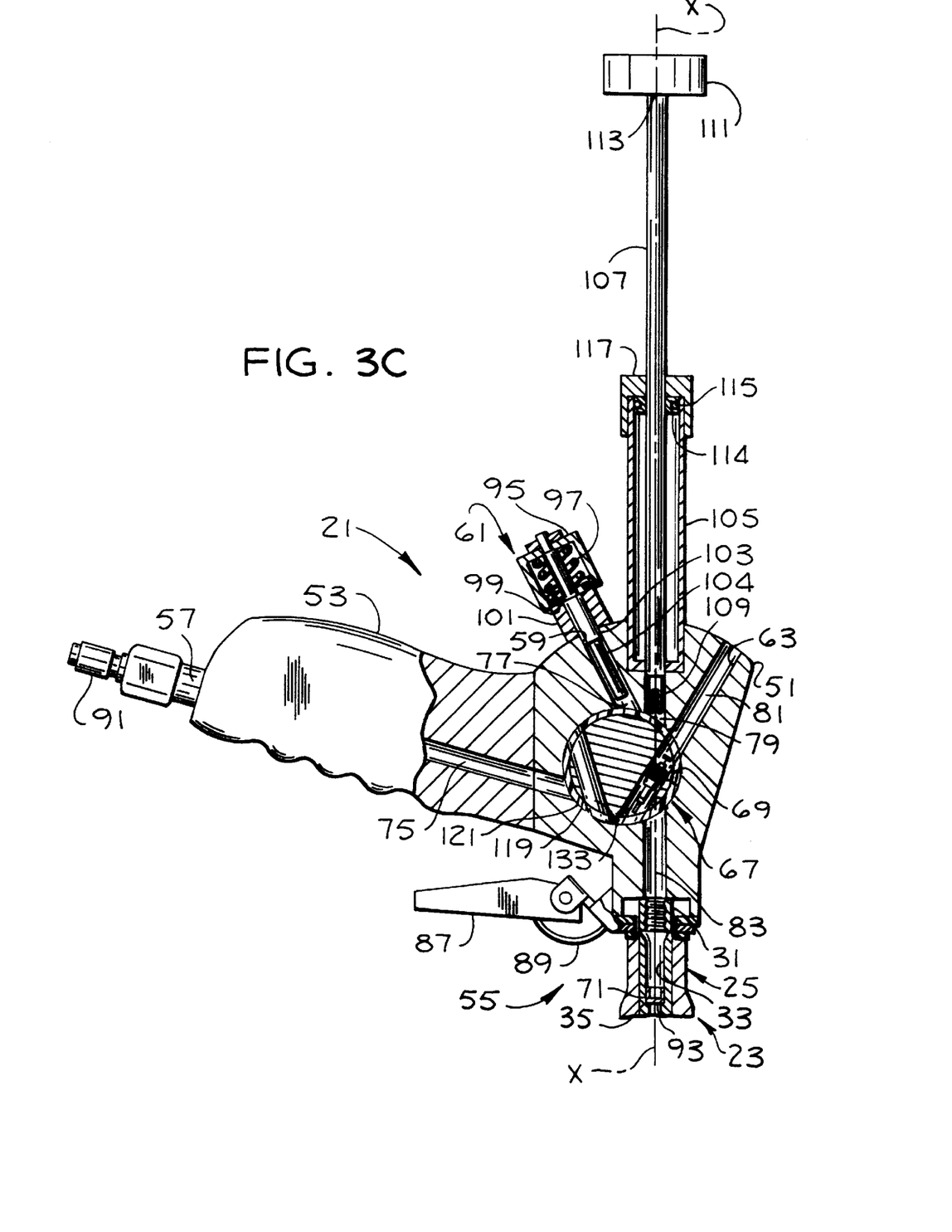

The next step is to rotate the selector valve 67, via the lever 129, to a third setting (FIG. 3C) in which the second bore 135 is in registry with the valve core passage 81. A valve core 27 is loaded into the valve core passage 81 through the valve core insertion inlet 63 and is pushed into the second bore 135 in the selector valve 67 as shown in FIG. 3C. If necessary, the filter loading assembly 61 may be used within the valve core passage 81 to push the valve core 27 into the second bore 135. The opposing end of the second bore 135 is closed by the body 51 so that the valve core 27 is retained within the second bore until the selector valve 67 is moved to a different setting.

Referring now to FIG. 3D, with the valve core 27 loaded in the second bore 135 of the selector valve 67, the lever 129 is used to rotate the valve back to its second setting to re-align the second bore in registry with the outlet passage 83 and plunger passage 79. The plunger 107 is then moved through its forward stroke to push the valve core 27 into the valve stem passage 33. The plunger 107 should be moved a distance sufficient to cause the forked head 109 of the plunger to fit over the flats 47 of the threaded insert 45 of the valve core 27, at which point the plunger 107 is rotated about its axis to screw the valve core into engagement with the internal threads of the outer end 31 of the valve stem 25 for securing the valve core within the valve stem passage 33. With the valve core 27 and filter element 71 installed in this manner, particulate material in the interior volume V of the wheel assembly W of a size capable of interfering with proper operation of the valve core is blocked by the filter element from flow through the valve stem passage 33 while other fluid under pressure is allowed to flow through the passage. The tool 21 is then disconnected from the valve stem 25 by again squeezing the trigger 87 of the valve stem connector 55 to move the spring clamp 89 out of engagement with the valve stem, and pulling the tool away from the stem.

While the tool 21 is described herein for manual operation, it is contemplated that the various operational components of the tool, including the lever 129 and the selector valve 67, the valve stem connector 55, the filter loading assembly 61 and plunger 107 may be automatically operated for increasing the rate at which filter elements can be inserted into wheel assemblies. Additionally, only the outlet passage 83 in the body 51 need be aligned along the central longitudinal axis X of the valve stem passage 33. The remaining passages 75, 77, 79, 81 and components may be located on the body 51 other than described herein without departing from the scope of this invention. Moreover, while the selector valve 67 is shown and described herein as rotating within the body 51 and having a rotational axis Y perpendicular to the body, numerous other selector valve embodiments are contemplated to be within the scope of this invention, such as a selector valve having a rotational axis in the plane of the body, as long as the valve is adapted for allowing fluid passage into the valve stem passage 33 when moved to a first position, and for preventing fluid passage in and out of the valve stem passage when moved to another position during operation of the other tool components.

It will be observed from the foregoing that the tool 21 and method of operation described herein satisfy the various objectives of the present invention. Providing a filter passage 77 separate from the plunger passage 79 allows the filter element 71 to be installed into the valve stem passage 33 without disconnecting the tool 21 from the valve stem 25 and without removing the plunger 107 from its guide tube 105, thereby reducing the risk of losing the plunger, reducing the loss of pressure within the interior volume V of the wheel assembly W, and providing an efficient and reliable tool for inserting the filter element 71 into the valve stem passage 33. The mesh size of the filter element 71 is sized to inhibit particulate material from passing into the valve stem passage 33 and potentially adversely affecting operation of the valve core 27, thereby reducing the risk of gas leakage from the interior volume V of the wheel assembly W.

Additionally, the provision of the fluid passage 75, the valve core passage 81 and the selector valve 67 allow the user to selectively inject fluid under pressure into the interior volume V of the wheel assembly W, insert the filter element 71 into the valve stem passage 33, and install the valve core 27, all without disconnecting the tool from the valve stem, thus increasing the efficiency of the tool 21. This is particularly useful in the manufacture of new tires where the valve core 27 has not yet been installed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tool for inserting a filter element into a pneumatic wheel assembly comprising a circular rim for attachment to a rotatable hub of a vehicle, and an annular tire attached to the rim, the rim and tire defining an interior volume capable of being pressurized to support the vehicle, the wheel assembly further comprising a valve assembly including a tubular valve stem having an internal passage in fluid communication with the interior volume of the wheel assembly and a sealing valve adapted for positioning within the valve stem passage for selectively permitting fluid to enter and exit said interior volume through the valve stem passage, said tool comprising:

a body having a first passage therein defining a plunger passage, said body being selectively attachable to the valve stem in a position wherein said plunger passage is in communication with the valve stem passage;

a plunger mounted on the body for reciprocation with respect to said plunger passage through a forward stroke in which the plunger is adapted to move through the plunger passage to push a filter element therein into said valve stem passage before the sealing valve is positioned in the valve stem passage, said plunger then being movable back through a return stroke from the valve stem passage into the plunger passage;

the body having a second passage therein defining a fluid passage adapted for fluid communication with a source of fluid under pressure, said fluid passage being adapted for fluid communication with said valve stem passage when the body is attached to said valve stem whereby fluid under pressure may be delivered to said interior volume via said valve stem passage.

2. A tool as set forth in claim 1 further comprising a selector valve on the tool body having a first bore therein, the selector valve being selectively moveable between a fluid-flow position in which the first bore is in registry with the fluid passage in the body and in fluid communication with said valve stem passage to provide fluid communication between the fluid passage and the valve stem passage, and a fluid-blocking position in which the first bore is out of registry with the fluid passage to block the flow of fluid between the fluid passage and the valve stem passage.

3. A tool as set forth in claim 2 wherein the body has an outlet adapted to register with said valve stem passage when the body is attached to the valve stem, the selector valve having a second bore therein adapted for registry with said plunger passage and said outlet when the selector valve is in its said fluid-blocking position, said plunger being movable through its forward stroke through said second bore and said outlet for pushing a filter element in the second bore into said valve stem passage.

4. A tool as set forth in claim 3 wherein said selector valve is rotatably mounted in the body, and wherein said first and second bores are angled with respect to each other.

5. A tool as set forth in claim 4 wherein the selector valve is cylindrical and said first and second bores are directed along chords of the selector valve.

6. A tool as set forth in claim 3 wherein the body has a third passage therein defining a filter passage for receiving a filter element to be inserted into the valve stem passage, said second bore in the selector valve being adapted to register with said filter passage when the selector valve is in its said fluid-flow position, the second bore being adapted for receiving and retaining the filter element until the selector valve is moved to its fluid-blocking position.

7. A tool as set forth in claim 6 further comprising a filter loading assembly for pushing the filter element through said filter passage into said second bore.

8. A tool as set forth in claim 7 wherein said filter loading assembly comprises a ram removably connected to the body adjacent said filter passage.

9. A tool as set forth in claim 8 wherein said selector valve is rotatably mounted in the body, and wherein said first and second bores are angled with respect to each other.

10. A tool as set forth in claim 9 wherein the selector valve is cylindrical and said first and second bores are directed along chords of the selector valve.

11. A tool as set forth in claim 10 further comprising a valve stem connector on the body for attachment of the body to said valve stem.

12. A tool as set forth in claim 11 further comprising a handle on the body for holding the body in position while the plunger is operated.

13. A tool for inserting a filter element into a pneumatic wheel assembly comprising a circular rim for attachment to a rotatable hub of a vehicle, and an annular tire attached to the rim, the rim and tire defining an interior volume capable of being pressurized to support the vehicle, the wheel assembly further comprising a valve assembly including a tubular valve stem having an internal passage in fluid communication with the interior volume of the wheel assembly and a sealing valve adapted for positioning within the valve stem passage for selectively permitting fluid to enter and exit said interior volume through the valve stem passage, said tool comprising:

a body having a first passage therein defining a plunger passage, said body being selectively attachable to the valve stem in a position wherein said plunger passage is in registry with the valve stem passage;

the body having a second passage therein defining a filter passage, said filter passage being in communication with the plunger passage and adapted for receiving a filter element therein and for directing the filter element into the plunger passage; and a plunger mounted on the body for reciprocation with respect to said plunger passage through a forward stroke in which the plunger is adapted to move through the plunger passage to push the filter element therein into said valve stem passage before the sealing valve is positioned in the valve stem passage, said plunger then being movable back through a return stroke from the valve stem passage into the plunger passage.

14. A tool for inserting a filter element into a pneumatic wheel assembly comprising a circular rim for attachment to a rotatable hub of a vehicle, and an annular tire attached to the rim, the rim and tire defining an interior volume capable of being pressurized to support the vehicle, the wheel assembly further comprising a valve assembly including a tubular valve stem having an internal passage in fluid communication with the interior volume of the wheel assembly and a sealing valve adapted for positioning within the valve stem passage for selectively permitting fluid to enter and exit said interior volume through the valve stem passage, said tool comprising:

a body selectively attachable to the valve stem, said body having an outlet adapted to register with said valve stem passage when the body is attached to the valve stem, a first passage therein defining a plunger passage and a second passage therein defining a filter passage for receiving a filter element into the body, a plunger mounted on the body for reciprocation through a forward stroke in which the plunger is adapted to push the filter element through the outlet into said valve stem passage before the sealing valve is positioned in the valve stem passage, said plunger then being movable back through a return stroke from the valve stem passage into the plunger passage, and means for moving the filter element received in said filter passage into registry with said plunger passage and said outlet while the body is attached to the valve stem to allow the filter element to be pushed by the plunger through the outlet into the valve stem passage.

15. A tool as set forth in claim 14 wherein said moving means comprises a selector valve on the tool body having a bore therein, the selector valve being selectively moveable between a filter insertion position in which the bore is in registry with the filter passage so that the filter element is received in the bore, and a plunger position in which the bore is in registry with the plunger passage and the outlet of the body to allow the plunger to push the filter element through the outlet into the valve stem passage.

16. A tool as set forth in claim 15 wherein said filter passage is further adapted for receiving a sealing valve and for directing the sealing valve into the bore when the selector valve is in the filter insertion position, the plunger being further adapted for pushing the sealing valve through the outlet into the valve stem passage when the selector valve is in the plunger position.

17. A tool as set forth in claim 15 wherein the body has a third passage therein defining a fluid passage, the fluid passage being adapted for fluid communication with a source of fluid under pressure, said fluid passage being further adapted for fluid communication with said valve stem passage when the body is attached to said valve stem whereby fluid under pressure is delivered to said interior volume via said valve stem passage.

18. A tool as set forth in claim 14 wherein the body has a third passage therein defining a fluid passage, the fluid passage being adapted for fluid communication with a source of fluid under pressure, and further wherein said moving means comprises a selector valve on the tool body having first and second bores therein, the selector valve being selectively moveable between a filter insertion position in which the first bore is in registry with the fluid passage and the outlet to provide fluid communication between the fluid source and the valve stem passage and the second bore is in registry with the filter passage whereby the filter element is loaded into the second bore, and a plunger position in which the first bore is out of registry with the outlet to block the flow of fluid between the fluid passage and the valve stem passage and the second bore is in registry with the plunger passage and the outlet to allow the plunger to push the filter element through the outlet into the valve stem passage.

19. A tool as set forth in claim 18 wherein said filter passage is further adapted for receiving a sealing valve when the selector valve is in its said filter insertion position for loading the sealing valve into the second bore, the plunger being further adapted for pushing the sealing valve through the outlet into the valve stem passage when the selector valve is in its said plunger position.

20. A tool as set forth in claim 18 wherein said body further comprises a fourth passage defining a sealing valve passage for receiving a sealing valve, the selector valve being selectively movable to a sealing valve insertion position in which the second bore is in registry with the sealing valve passage for receiving the sealing valve, the plunger being further adapted to push the sealing valve through the outlet into the valve stem passage when the selector valve is in the plunger position.

21. A method for inhibiting the escape of particulate matter through a valve assembly of a pneumatic wheel assembly, said wheel assembly defining an enclosed interior volume for holding fluid under pressure, said valve assembly comprising a valve stem having a passage therethrough for permitting fluid under pressure to be introduced into said interior volume, said passage having an inlet end accessible from outside the wheel assembly and an outlet end adjacent said interior volume, said method comprising the steps of:

inserting a filter element in the valve stem passage while the valve stem is connected to the wheel assembly, said filter element being configured to substantially prevent the passage of particulate matter while allowing the passage of pressurized fluid; and installing a sealing valve in the valve stem passage after insertion of the filter element, the sealing valve being movable between an open position for allowing pressurized fluid to flow through said passage and a closed sealing position, the sealing valve being positioned between the inlet end of the passage and the filter whereby the filter functions to substantially prevent particulate matter from inside the interior volume of the wheel assembly from interfering with the sealing closure of the sealing valve.

22. A method for inhibiting the escape of particulate matter through a valve assembly of a pneumatic wheel assembly as set forth in claim 21 wherein the step of inserting the filter element into the valve stem passage is performed while the interior volume of the wheel assembly at least partially contains fluid under pressure.

23. A method as set forth in claim 21 wherein said step of inserting a filter element in the valve stem passage comprises:

attaching a filter insertion tool to the valve stem, said tool having a body adapted for receiving a filter element therein, said body having an outlet adapted to register with the valve stem passage when the tool is attached to the valve stem and a plunger mounted on the body for reciprocation with respect to the body through a forward stroke in which the plunger is adapted to push a filter element through the outlet into the valve stem passage, said plunger then being movable back through a return stroke;

loading a filter element into the body of the tool; and moving the plunger through its said forward stroke to push the filter element through the outlet into the valve stem passage.

24. A method as set forth in claim 21 wherein the filter element has a mesh size of about 5–100 microns.

25. A method as set forth in claim 24 wherein the filter element mesh size is about 30–80 microns.

26. A method as set forth in claim 25 wherein the filter element mesh size is about 40–50 microns.

27. A method for inhibiting the escape of particulate matter through a valve assembly of a pneumatic wheel assembly, said wheel assembly defining an enclosed interior volume for holding fluid under pressure, said valve assembly comprising a valve stem having a passage therethrough for permitting fluid under pressure to be introduced into said interior volume, said passage having an inlet end accessible from outside the wheel assembly and an outlet end adjacent said interior volume, said method comprising the steps of:

affixing a filter element to a sealing valve, and installing the sealing valve with the filter element affixed thereto into the valve stem passage while the valve stem is connected to the wheel assembly, the sealing valve being movable between an open position for allowing air under pressure to flow through said passage and a closed sealing position, the filter element being configured to substantially prevent particulate matter from inside the interior volume of the wheel assembly from interfering with the sealing closure of the sealing valve.

28. A method for inhibiting the escape of particulate matter through a valve assembly of a pneumatic wheel assembly as set forth in claim 27 wherein the sealing valve is installed in the valve stem passage while the valve stem is connected to the wheel assembly and the interior volume is holding fluid under pressure.

29. A valve assembly for use in combination with a pneumatic wheel assembly comprising a circular rim for attachment to a rotatable hub of a vehicle, and an annular tire attached to the rim, the rim and tire defining an interior volume capable of being pressurized to support the vehicle, the valve assembly permitting fluid to enter said interior volume and selectively preventing fluid from exiting said wheel assembly, the valve assembly comprising:

a valve stem having an internal passage therethrough for communicating with the interior volume of the wheel assembly to permit fluid to enter and exit the wheel assembly, the internal passage having inlet and outlet ends, and means for attachment of the valve stem to the wheel assembly so that the inlet end of said passage is accessible from outside the wheel assembly and the outlet end of the passage is adjacent the interior volume of the wheel assembly;

a sealing valve positioned within the valve stem passage for movement between an open position for allowing fluid under pressure to flow through said passage and a closed sealing position; and a filter element fixedly positioned against longitudinal movement within the valve stem passage intermediate the sealing valve and the outlet end of the passage, the filter element being configured for substantially preventing passage of particulate matter of a size capable of interfering with movement of the sealing valve to its closed sealing position.

30. A valve assembly as set forth in claim 29 wherein the filter element is affixed to the sealing valve.

* * * * *